United States Patent Office 3,363,761
Patented Jan. 16, 1968

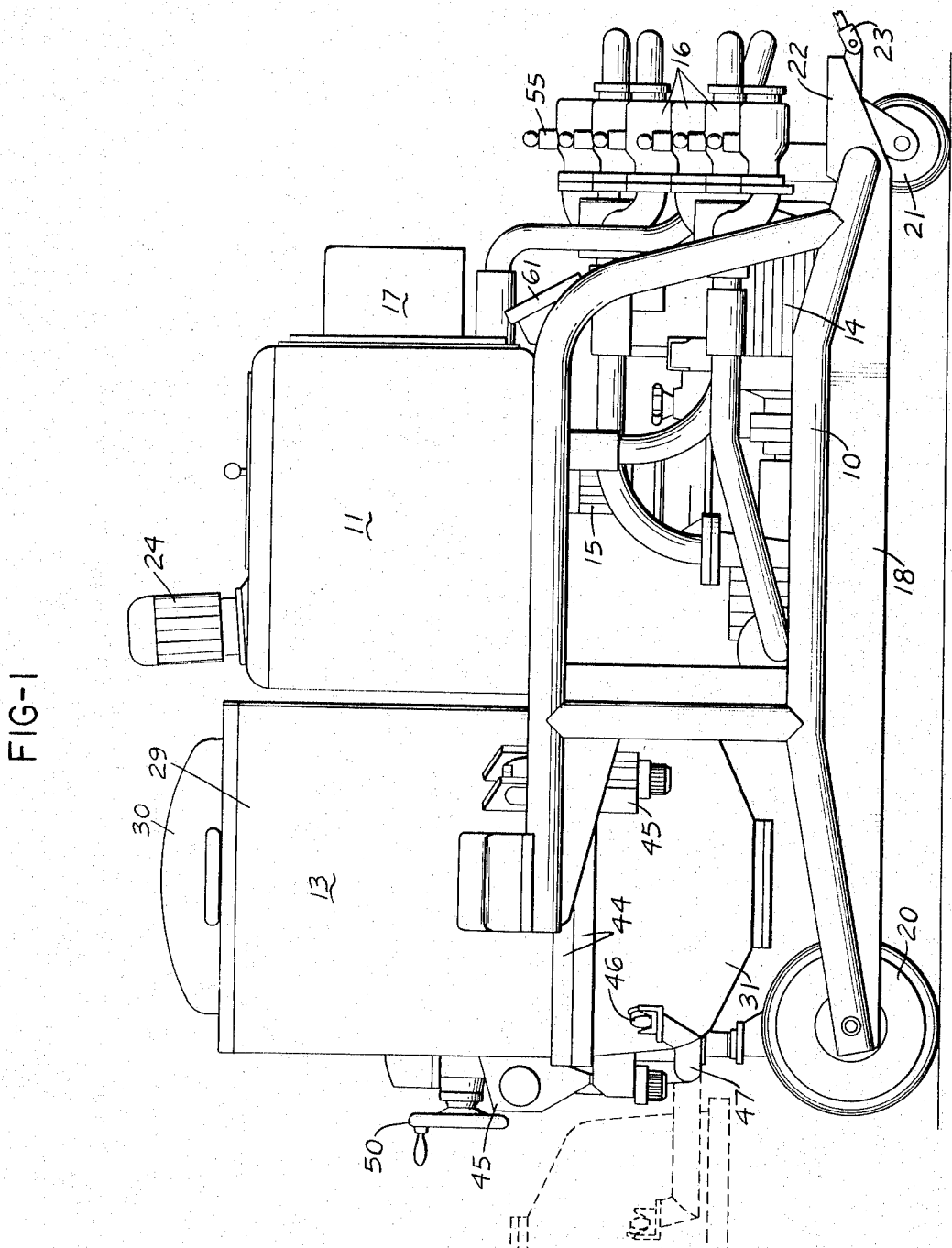

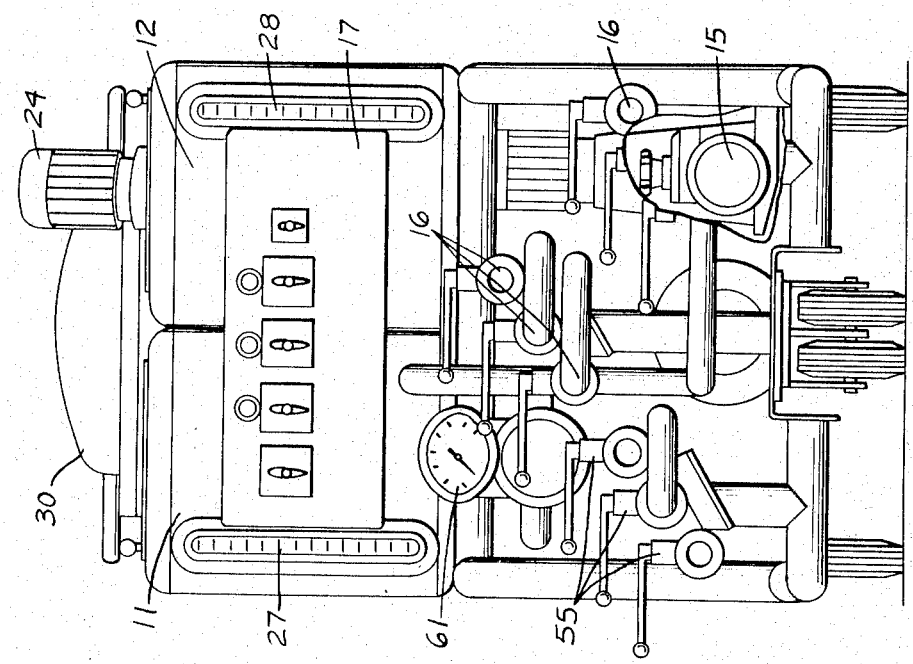

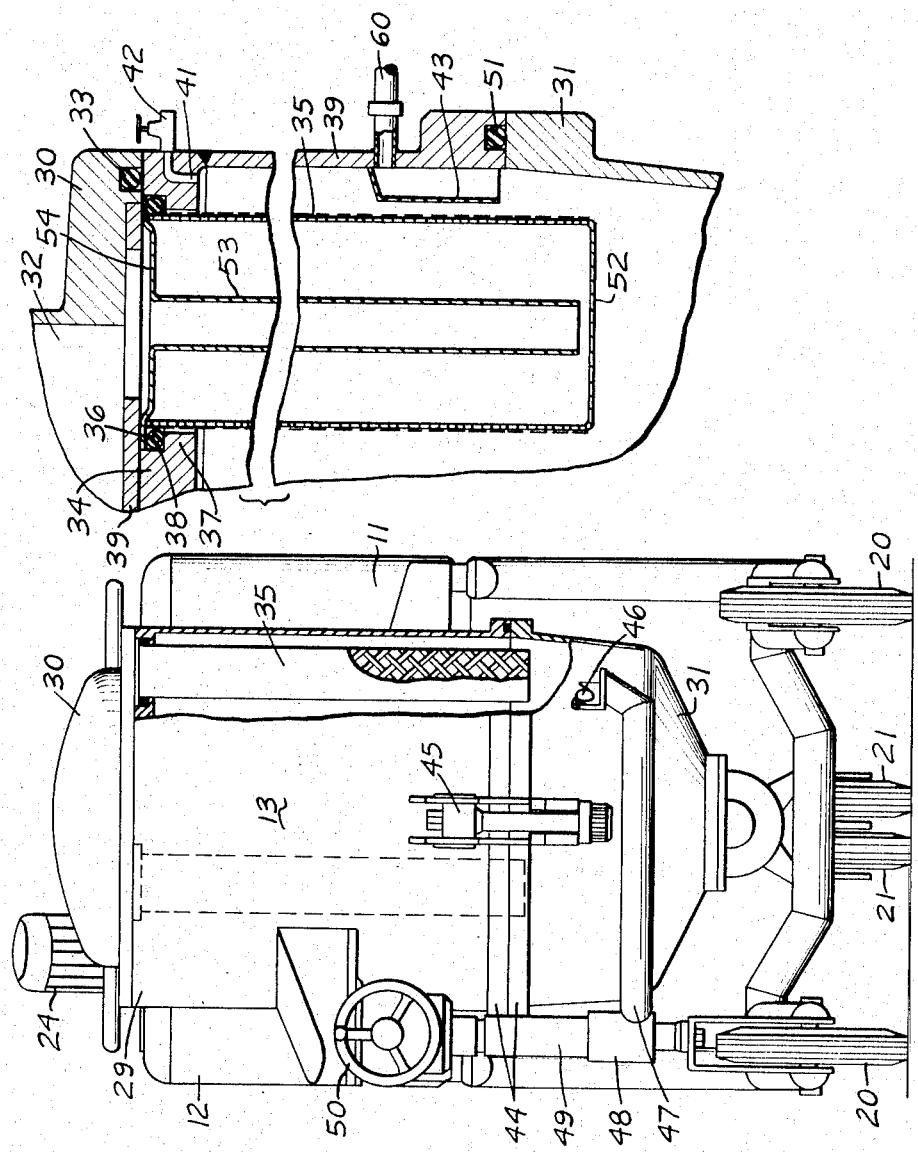

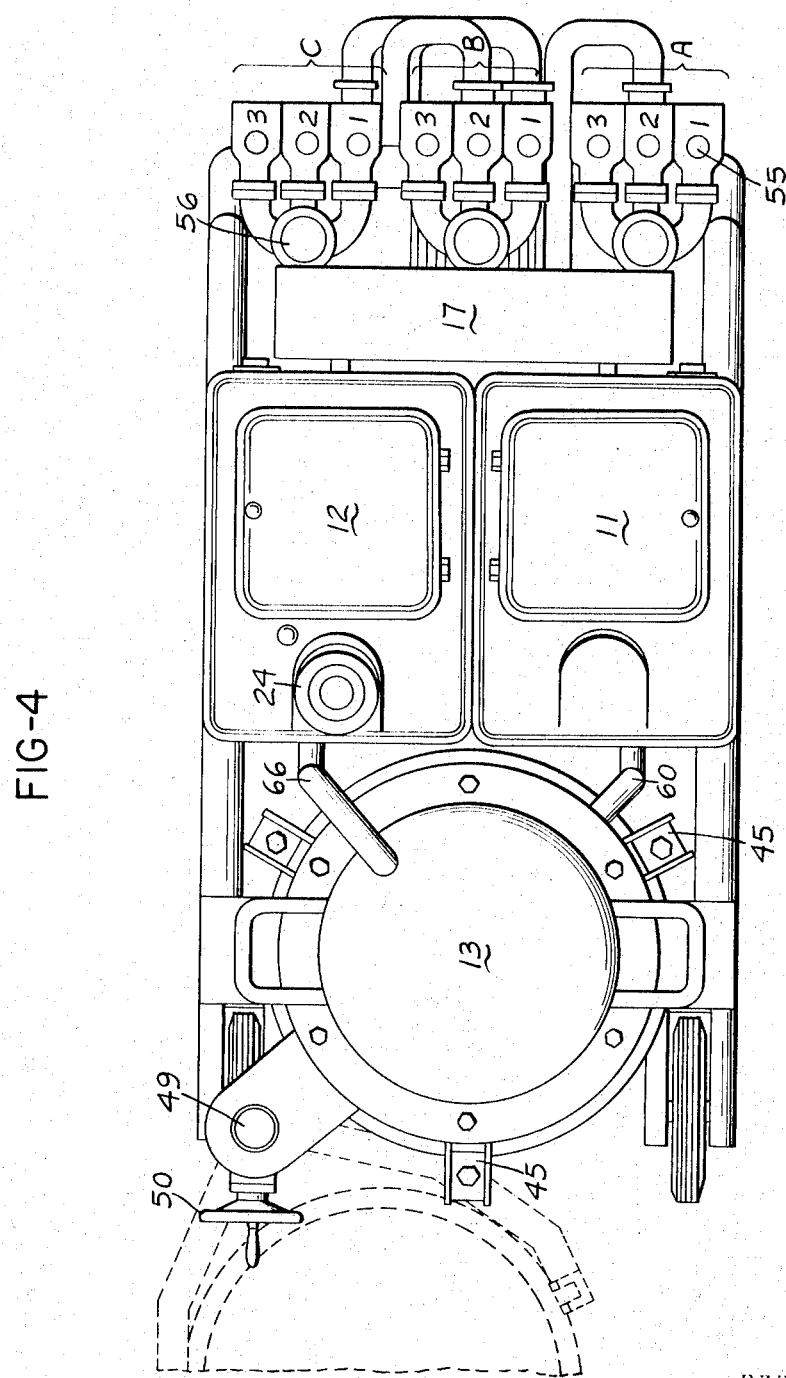

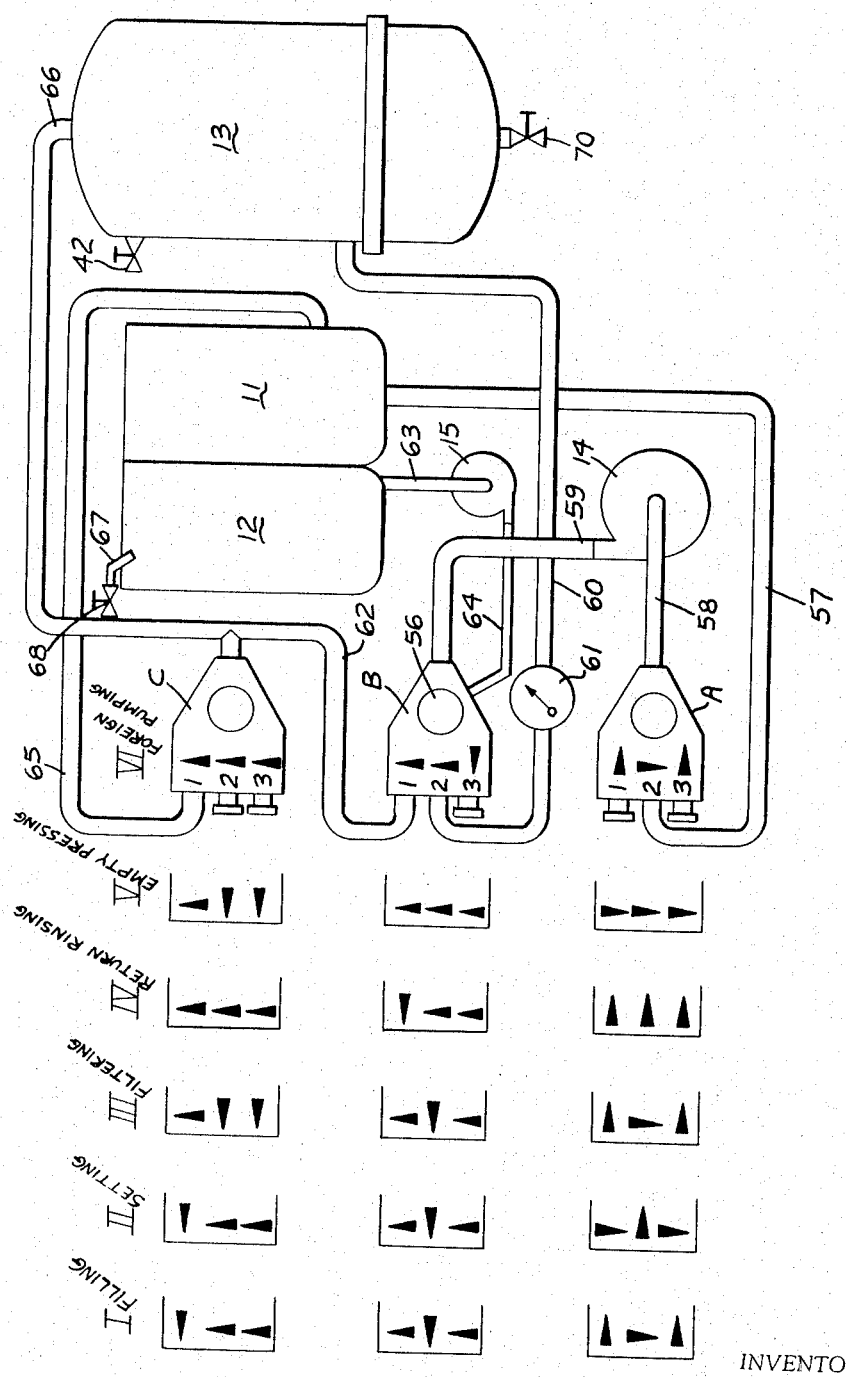

3,363,761
MOVABLE SETTLING FILTER
Joachim Groth, Bad Munster am Stein, and Horst Bencker, Bad Kreuznach, Germany, assignors to Seitz-Werke G.m.b.H., Bad Kreuznach, Germany
Filed July 13, 1964, Ser. No. 382,237
Claims priority, application Germany, July 19, 1963, S 86,279
2 Claims. (Cl. 210—87)

The present invention concerns a movable settling filter with a plurality of vertically arranged containers for respectively receiving filter elements and auxiliary filter substances which, by means of a pump, are meted out into the liquid to be filtered and are settled. With this type of filtering devices which are employed particularly in breweries and wineries, it is known to provide the filter container with a mixing container and to arrange both with the feeding pumps for the filtrate and the auxiliary filter substance on a carriage. However, in most instances, a single mixing container will not suffice or meet the requirements of a high output filtering device to yield a fast and proper filtration because the only container has to be employed both for the basic layer to be settled at the start of the filtration and also for the filtering mass which subsequently is to be introduced into the filtrate. With heretofore known filtering devices which have a second mixing container, however, a further drawback is encountered inasmuch as such second mixing container crowds the arrangement of container and pumps on the carriage and thus makes a checking thereof more difficult. These constructions do not permit an arrangement of the closure fittings of the pipe lines between the containers and pumps and of the control elements and of the indicating instruments at a central location of the filtering device to thereby permit a simple operation of the filter. Consequently, no consideration is given to the customary unfavorable mounting of such filtering devices in rather narrow basement aisles or corners.

It is, therefore, an object of the present invention to provide movable settling filters, which will overcome the above mentioned drawbacks.

It is another object of this invention to improve heretofore known movable settling filters so as to increase their utility and to assure a fast and safe operation.

These and other objects and advantages of the invention will appear more clearly from the following specification in connection with the accompanying drawings, in which:

FIG. 1 is a side view of a filter according to the present invention.
FIG. 2 shows the filter from the operating side.
FIG. 3 illustrates the rear of the filter.
FIG. 4 is a top view of the filter.
FIG. 5 illustrates a specific part of the filter according to the invention.
FIG. 6 is a diagram of the conduit system of the filter.

The present invention is characterized primarily in that the filter container has associated therewith two separate mixing containers which are adapted through the intervention of fixed conduits selectively to be connected to said filter container. The filter container is arranged in upright position at one end of the carriage frame, said end being located in the driving direction of the carriage, preferably in the direction of the longitudinal axis thereof. At the other carriage frame end forming the central operating side of the filter, the two mixing containers are arranged adjacent to each other in upright position at both sides of the carriage frame axis. Finally, all valves and closing fittings for controlling the liquid supply and discharge and the filtering operation, and also all switch and control elements and indicating instruments are arranged at the operating side of the filter and are accessible from said operating side.

According to a further development of the present invention, for the said central operation of the filter, the valves and closure fittings of the fixed conduits are combined to a separate inlet group, mixing group, and discharge group, and are arranged step-wise adjacent to each other.

In conformity with the present invention, the valves and closure fittings are, within the individual groups, likewise arranged step-wise.

Referring now to the drawings in detail, the filter shown in FIGS. 1 to 4 substantially comprises a carriage frame 10 which may be built up of tubular or pressed steel sections and carries the containers 11, 12 and 13, pumps 14, 15, a group of fittings 16 and a control box 17. Pump 14 is elastically mounted on a lower plate 18 of carriage frame 10.

The end portions of carriage frame 10 are provided with wheels or rollers 20, 21. Preferably, one end of the carriage frame 10 is supported by two oppositely located wheels 20, whereas the other end is supported by one wheel or a double wheel 21, so that a three-point support is obtained. At the front end of the carriage frame 10, the individual or double wheel 21 is arranged in a bearing 22 provided with a pulling element 23 by means of which the carriage frame 10 may be guided when transporting the filter.

At the rear end of carriage frame 10, preferably along the central axis of the carriage frame, there is provided a container 13 standing in upright position. Containers 11 and 12 are provided at the front end of the carriage frame 10 adjacent to each other at both sides of the central longitudinal plane of the carriage frame. The arrangement is such that if the central vertical axes of the three containers were interconnected to each other, the interconnecting lines would form an isosceles triangle the basis of said triangle connecting the axes of said containers 11, 12, and the sides respectively connecting the axis of the filter container 13 with the axis of one of the filter containers 11, 12 respectively.

The containers 11, 12 which expediently have a rectangular cross-section and are provided with large closable openings, receive the auxiliary filter substance, for instance diatomaceous earth, required for the filtering operation. Container 11 serves in particular as through flow container. For settling or depositing a first auxiliary filter layer or for fixing an already settled filter layer, the settling liquid is in a circuit pumped from container 11 and then returned thereto. Container 12 serves for receiving a quantity of auxiliary filter substance which is required for continuous addition to the filtrate. Container 12 is equipped with an agitating mechanism 24. The feeding and discharge conduits for the filter substance are connected to the bottom or near the bottom at the end faces of the two containers 11, 12. Furthermore, the said containers are provided with discharge openings for emptying the same. For controlling the contents of the two containers 11, 12, the front end faces facing the operating side of the filter are each provided with a sight-glass 27, 28 with a corresponding scale, for instance a quart scale.

Container 13 comprises filtering elements 35 and has an upper container portion 29 with lid 30 and a lower container portion 31. Lid 30 is detachably connected to the upper part 29 and has a collecting chamber 32 for the filtrate which is discharged through a line 66 connected to lid or cover 30. When cover 30 is in its closing position, a round seal 33 thereof engages a plate 34 in the container upper part 29, said plate forming the holding means for the filtering elements 35 (FIG. 5). Plate 34, which expediently may have a round shape, has a plurality of recesses 36 which are adapted to the outer circumference of the filtering elements 35 and which are arranged at uniform distances from each other around a central recess in plate 34. Plate 34 is provided with extensions or shoulders 37 on which the filtering elements 35 rest through the intervention of an annular seal 38. Seal 38 also compensates for any difference in the manufacturing tolerances. Lid 30 has inserted thereinto a perforated disc 39 which closes the collecting chamber 32. Disc 39 holds the filtering elements in their mounting 36, 37. A feeding line for the filtrate and a compressed gas conveying conduit 41 lead into the container upper part 29, said conduit 41 being provided with a control valve 42 which expediently may be arranged at the operating side of the filter within the range of the group 16 of fittings. In front of the mouth of conduit 60 on the inside of the container wall there is connected a deviating member 43.

The lower container part 31 is likewise detachably connected to the container part 29 and serves as catching bowl for the filtration residues. The bowl walls are preferably conically shaped for facilitating the detachment of said residues. A plurality of closure means 45 serve as connecting means for the containers 29, 31 and are arranged on the circumference thereof and adapted to act upon the flange-like container protrusions 44. Container part 31 is furthermore equipped with horizontally extending pivots 46 and by means thereof rest on the arms of a fork-shaped supporting member 47. At the branch point of the two arms 47 there is provided a threaded nut 48 which is adjustable as to height and is rotatable on a vertical threaded spindle 49. A hand-wheel 50 is through a transmission of any standard type (not illustrated) drivingly connected to spindle 49 (FIG. 3). Sealing means 51, preferably in the form of O-rings are inserted into the flange-like protrusions 44 of the container parts 29 and 31.

Each of the filter elements 35 comprises a hollow body with a perforated outer wall, which body is closed at its lower end by a bottom 52. An ascending tube 53 coaxially arranged in hollow body 35 and open at the bottom while being provided with a cover 54 closes the upper opening of the hollow body with the exception of the outlet of tube 53. A further prefabricated layer for settling the auxiliary filter substance may be placed upon the perforated outer wall of the filter elements 35. At the front end of the filter, which end forms the operating side of the filter, there is provided a group 16 of fittings, valves, or the like for controlling the entry and discharge of liquid and also the course of the liquid within the filter (see FIGS. 2 and 4). These valves or fittings comprise standard ball cocks 55 which have been combined to three control groups A, B and C (FIG. 6) with three cocks each. These control groups are respectively equipped with an illuminated sight-glass 56 for observing the filter substance and are arranged step-wise one above the other. In a similar, easily checked manner, cocks 55 are arranged within the individual groups. The character A designates the inlet group comprising three cocks 55. The character B designates the distributing group likewise comprising three cocks, and finally, the character C designates the discharge group likewise equipped with three cocks.

The inlet group A has two cocks 55 for the admission of liquid into the filter, said cocks being designated in FIG. 6 with the character A1 and A3. The inlet group A furthermore comprises means for connection with hoses. A conduit 57 leads from cock A2 of the inlet group A to the mixing container 11. Inlet group A has through a conduit 58 connected thereto a pump 14 from which a conduit 59 leads to the distributing group B. In said group B a conduit 60 leads from cock B2 to filter container 13. Conduit 60 has interposed therein a liquid quantity meter 61 which may be read from the operating side of the filter. A further cock B3 is associated with one of the liquid outlets in said group, said outlet likewise being provided with means for connecting a hose thereto. Cock B1 has connected thereto a fixed conduit 62 leading to group C. Finally, a conduit 63, 64 connects the mixing container 12 through a metering pump 15 with the cock group B.

In the outlet group C, two cocks C2, C3 precede each liquid discharge which is likewise provided with connecting means for a hose. A fixed conduit connection 65 leads from cock C1 to the mixing container 11. A conduit 66 leads from the filter container 13 to the discharge group C. Prior to entering group C, conduit 66 is connected with conduit 62 coming from group B. A conduit 67 branches off from conduit 66 and leads to a mixing container 12, said conduit 67 being provided with a shut-off valve 68.

Control box 17 facing the operating side, houses the control instruments, for instance switches, control lamps for the motors driving the pumps 14, 15, etc. For preparing the filtration by means of the above-described filtering device, the valves 16 of which are closed, the container 13 equipped with a corresponding number of filter elements 35 is likewise closed. Thereupon, the containers 11, 12 and 13 are filled with liquid. The liquid is admitted through a hose (not illustrated) which is selectively connectable to the connection of cocks 1 and 3 of the inlet group A. The liquid pumped by pump 14 flows through one of the open cocks, conduit 58, pump 14, conduit 59, cock B2, and conduit 60 into container 13 and after the latter is filled through conduit 66 of cock C1, conduit 65 into container 11 (Cock position I—"Filling"—FIG. 6). Through the open shut-off valve 68 and conduit 67, the liquid enters container 12. The filled containers 11 and 12 are then charged with a quantity of auxiliary filter substance sufficient for the intended filtration.

For purposes of effecting a deposit of the auxiliary filter substance on the filter elements 35 in container 13, the cocks A1 and A3 are closed and cock A2 is opened so that when the position of the cocks in groups B and C remains unchanged, the liquid enriched with auxiliary filter substance will, through the closed circuit, flow from container 11 into container 13, said closed circuit comprising operating pump 14, conduit 59, cock B2, conduit 60, container 13, conduit 66, cock C1, conduit 65, container 11, conduit 57, cock A2, and conduit 58. After, in container 13, the liquid has deposited the auxiliary filter substance on element 35, the liquid is returned to container 11. (Cock position II—"Settling"—FIG. 6).

For the purposes of carrying out the then following filtering process proper, the circuit which was closed for the presetting operation is shut off by closing the cocks A2 and C1. At the same time, for the admission of filtrate on the slurry side and for the discharge of the filtrate on the glossy side selectively cocks A1 or A3 and C1 or C3 are opened. The liquid will then flow from inlet A1 or A2, conduit 58, pump 14, conduit 59, cock B2, and conduit 60 into container 13 and, as was done with the presettling, will pass through the perforated wall of the filter element 35 and the layer settled thereon and subsequently will rise in pipes 53 of elements 35 into the collecting chamber 32. Finally, the filtrate passes through conduit 66 to the outlet C2 or C3 (cock position III—"Filtering"—FIG. 6). Still on the slurry side—within the range of the distributing group B, liquid enriched with auxiliary filter substance is through conduits 63, 64 continuously added and pumped by matering pump 15 from container 12 into the fluid flow. The output of both pumps 14 and 15 is indicated by the fluid meter 61.

For purposes of cleaning and emptying the filter after a filtering operation, there is provided one cycle each, viz. "returning rinsing" and "empty pressing." The return rinsing which is intended for detaching the settled layer from the filtering elements 35 so as to permit removal of the filtering residues from the filter, is effected after previously, the cocks have been turned into position IV (FIG. 6). Pump 14 will then, through the now selectively opened cocks A1, A3 (also A2 is possible) and through conduits 58, 59, cock B1, conduit 62, 66, pump liquid into container 13 for a short period. Due to the effect of the liquid shock at which a valve 70 on container 13 may be opened, or a check valve (not shown) may open, the settled layer becomes detached from the filtering elements 35 and collects on the bottom of container part 31.

For purposes of emptying container 13 from the residue liquid, all cocks of groups A and B are closed for the subsequent operation "empty pressing." In group C, cock C1 is likewise moved into its closing position. Through conduit 66 and the selectively opened cocks C2, C3, the residual liquid is by means of a pressure shock conveyed through conduit 41 (FIG. 5) pressed upwardly in the ascending pipes 53 of filtering elements 35 and into the collecting chamber 32 and removed. (Cock position V—"Empty Pressing"—FIG. 6.) The dropped-off filter cake residues in container part 31 which is now open and by means of spindle drive 48, 49 has been lowered and is tilted about spindle 48 toward the outside, may now be removed by a subsequent tilting of the container part 31 about pivots 46 and may be collected in a container or the like below the tilted container part 31.

In a further cock position VI—"Foreign Pumping"—FIG. 6, in which selectively one of the cocks A1, A3 and B3 is open, pump 14 may through the short conduit 58, 59 while by-passing container 13 and the other conduits, be employed for other work, which has nothing to do with the filtration.

It is, of course, to be understood that the present invention is, by no means, limited to the particular construction shown in the drawings, but also comprises any modifications within the scope of the appended claims.

What we claim is:

1. In a settling filtering plant supported by a movable carriage having a first end and an oppositely located second end, said ends respectively facing in the driving direction of said carriage and in the direction opposite thereto; a filter container mounted on said carriage at said first end, said second end forming the operating side from which said plant is to be operated, said filter container comprising a plurality of filter elements each forming a tubular body having a perforated side wall and being closed at the bottom, each filter element also comprising an ascending pipe arranged within said tubular body in spaced relationship to said perforated wall so as to define therewith an annular chamber, said pipe also being arranged in spaced relationship to the closed bottom of the respective tubular body, said tubular body being open at its ends, cover means closing the upper end of the annular chamber between said ascending tube and said perforated wall of said tubular body, two separate mixing containers mounted on said carriage at said operating side, said two mixing containers being arranged side by side on opposite sides of a vertical plane extending through said carriage in the driving direction thereof, conduit means leading from said mixing containers to said filter container, pumping means associated with said conduit means, indicating means interposed in said conduit means for indicating the flow of fluid therethrough, and control means likewise interposed in said conduit means and operable respectively and selectively to control communication between said filter container and said mixing containers, said indicating means and said control means being located at and accessible from said operating side.

2. A plant according to claim 1, which includes conduit means adapted to be connected to a source of pressure gas and arranged to convey such pressure gas through the walls of said tubular containers and the ascending pipes thereof for selectively removing residual fluid from said filter container.

References Cited

UNITED STATES PATENTS

| 101,735 | 4/1870 | Hunter | 210—201 X |
| 426,965 | 4/1890 | Seibel | 210—241 X |
| 618,142 | 1/1899 | Theurer | 210—195 X |
| 959,844 | 5/1910 | Dargin | 210—195 |
| 2,454,124 | 11/1948 | Birsch et al. | 210—253 |

FOREIGN PATENTS

| 4,978 | 7/1905 | France. |
| 846,321 | 9/1939 | France. |
| 955,915 | 1/1950 | France. |

OTHER REFERENCES

Cochrane Div., Crane Co., 3130 N. 17th St., Philadelphia, Pa., bulletin titled Cochran Uni-Pac Package Demineralizer, 1961.

REUBEN FRIEDMAN, *Primary Examiner.*

J. A DEE, *Assistant Examiner.*